(12) United States Patent

Labarta

(10) Patent No.: US 12,567,876 B1

(45) Date of Patent: Mar. 3, 2026

(54) SIMULTANEOUS RADIO CONTROL SYSTEM AND METHOD

(71) Applicant: Johnny Labarta, Las Vegas, NV (US)

(72) Inventor: Johnny Labarta, Las Vegas, NV (US)

( * ) Notice: Subject to any disclaimer, the term of this patent is extended or adjusted under 35 U.S.C. 154(b) by 410 days.

(21) Appl. No.: 18/224,157

(22) Filed: Jul. 20, 2023

Related U.S. Application Data

(60) Provisional application No. 63/391,290, filed on Jul. 21, 2022.

(51) Int. Cl.

| | |
|---|---|
| *H04B 1/401* | (2015.01) |
| *H04M 1/72403* | (2021.01) |
| *H04W 12/0431* | (2021.01) |
| *H04W 88/06* | (2009.01) |

(52) U.S. Cl.
CPC ........ *H04B 1/401* (2013.01); *H04M 1/72403* (2021.01); *H04W 12/0431* (2021.01); *H04W 88/06* (2013.01)

(58) Field of Classification Search
CPC .............. H04B 1/401; H04W 12/0431; H04M 1/72403
See application file for complete search history.

(56) References Cited

U.S. PATENT DOCUMENTS

| | | | |
|---|---|---|---|
| 6,856,506 | B2 | 2/2005 | Doherty et al. |
| 8,417,186 | B2 | 4/2013 | Preston et al. |
| 9,973,905 | B2 | 5/2018 | Auranen et al. |

| | | | |
|---|---|---|---|
| 10,178,513 | B2 | 1/2019 | Negalaguli et al. |
| 2009/0156246 | A1* | 6/2009 | Toba ........................ H04W 4/10 |
| | | | 455/518 |
| 2011/0034125 | A1* | 2/2011 | Preston ................... H04W 8/24 |
| | | | 455/518 |

(Continued)

FOREIGN PATENT DOCUMENTS

| | | | | |
|---|---|---|---|---|
| KR | 100822725 | B1 * | 4/2008 | ........... H04B 1/3833 |
| KR | 20100083530 | A * | 7/2010 | .............. H04W 4/10 |

OTHER PUBLICATIONS

Apple Developers, "Enhance voice communication with Push to Talk" Video, Published Jun. 7, 2022 by Apple Inc.; accessed via https://developer.apple.com/videos/play/wwdc2022/10117/.

(Continued)

*Primary Examiner* — David Bilodeau

(74) *Attorney, Agent, or Firm* — FRESH IP PLC; Clifford D. Hyra; Aubrey Y. Chen

(57) ABSTRACT

A system includes a control device, a first mobile computing device connected to the control device using at least one first flexible printed circuit (FPC) connector, and a second computing device that communicates with the first mobile computing device using at least one second FPC connector, wherein the control device receives input and the first mobile computing device receives a broadcast and a key value, the control device upon receiving the input simultaneously changes to a first particular channel for a first radio communication and a second particular channel for a second radio communication, the first particular channel associated with the second particular channel, and the first mobile computing device transmits the broadcast and the key value as the first radio communication and the second computing device transmits the broadcast and the key value as the second radio communication simultaneously.

23 Claims, 6 Drawing Sheets

Channel Knob Function Diagram

(56)     References Cited

U.S. PATENT DOCUMENTS

| | | | |
|---|---|---|---|
| 2017/0164165 A1* | 6/2017 | Negalaguli ......... | H04W 12/033 |
| 2018/0302948 A1 | 10/2018 | Kotlyarov | |
| 2021/0195563 A1* | 6/2021 | Lee .................... | H04W 12/041 |
| 2023/0122665 A1* | 4/2023 | Pai ........................ | H04L 9/0822 713/2 |
| 2023/0315915 A1* | 10/2023 | Zadok ................... | H04W 8/183 |

OTHER PUBLICATIONS

Grouptalk, Group PPT; accessed via https://grouptalk.com/services/group-ptt.

* cited by examiner

300

204

The Knobs are connected to Android board by a FPC

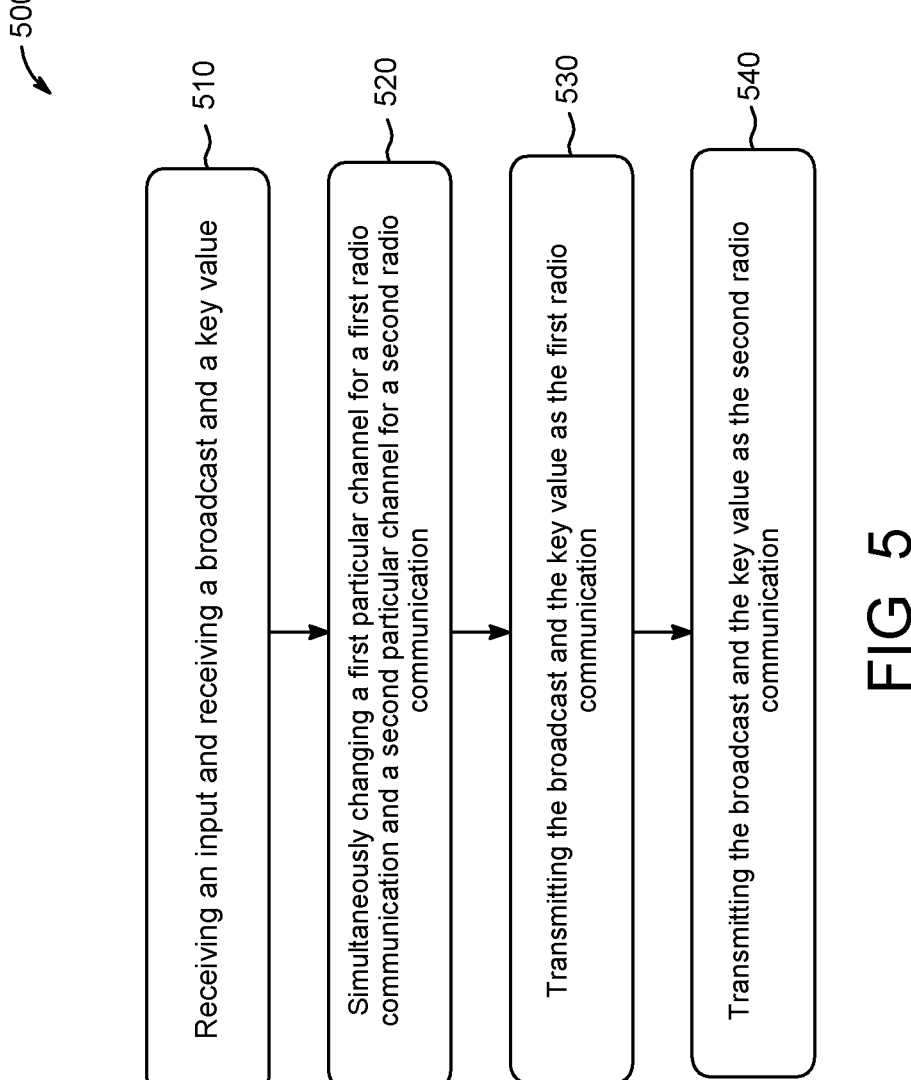

510 Receiving an input and receiving a broadcast and a key value

520 Simultaneously changing a first particular channel for a first radio communication and a second particular channel for a second radio communication 530 Transmitting the broadcast and the key value as the first radio communication 540 Transmitting the broadcast and the key value as the second radio communication

SIMULTANEOUS RADIO CONTROL SYSTEM AND METHOD

CROSS-REFERENCE TO RELATED APPLICATIONS

This application claims priority under 35 U.S.C. § 119 to U.S. Patent Application No. 63/391,290, filed Jul. 21, 2022 entitled "Simultaneous Radio Control System and Method," the entire contents of which is incorporated herein by reference.

BACKGROUND

Radio communication devices can be difficult and frustrating to use for a number of reasons. In the entertainment and movie industry, radio communication devices have been used by the production staff. As an example, the production staff has utilized push to talk radio communication devices having a nationwide range. As push to talk radio devices became less popular and more difficult to find, analog radio devices have been used. However, analog radio devices have a limited range over a short distance. Digital radio devices have become popular due to advancements in battery life and an improved range in communication over analog radio devices. However, there is a delay that prevents digital radio usage in the entertainment and movie industry. As an example, for close perimeter shoots, there can be echoes and a delay that makes the digital radio devices unusable. In particular scenarios and industries, it is imperative to be able to communicate quickly and easily with a variety of different devices that use different signals/communication methods.

It is with these issues in mind, among others, that various aspects of the disclosure were conceived.

SUMMARY

According to one aspect, a simultaneous radio control system and method is provided for simultaneously changing a first particular channel for a first radio communication and a second particular channel for a second radio communication. There may be a control knob that receives input from a user to simultaneously change to the first particular channel for the first radio communication and the second particular channel for the second radio communication. The control knob may be a physical knob that receives the input from a user and simultaneously changes to the first particular channel for the first radio communication and the second particular channel for the second radio communication. Alternatively, the control knob may be a graphical user interface (GUI) element that may be displayed on a display of a computing device and that receives input from the user and simultaneously changes to the first particular channel for the first radio communication and the second particular channel for the second radio communication. The control knob may be connected to the computing device using at least one flexible printed circuit (FPC) connector.

In some embodiments a system includes a control device that is a channel selection knob, a first mobile computing device that is a single board ANDROID computer, and a second computing device that is a single board analog computer, each of the first and second computing devices being configured to transmit radio communications. The control device may be connected to the first mobile computing device and/or the second computing device using at least one flexible printed circuit connector. The first and second mobile computing devices are connected and communicate with each other using at least one FPC connector. A user can turn the control knob to a certain indicator and the control knob simultaneously interacts with the second mobile computing device to switch to an analog channel corresponding with the certain indicator for analog radio communication and interacts with the first mobile computing device to switch to a digital channel corresponding with the certain indicator for cellular radio communication. The user activates the system and speaks a message into it and the first mobile computing device transmits the message by cellular radio communication over the digital channel and the second mobile computing device simultaneously transmits the message by analog radio communication over the analog channel.

In another example, a system may include a control device, a first mobile computing device connected to the control device using at least one first flexible printed circuit (FPC) connector, and a second computing device that communicates with the first mobile computing device using at least one second FPC connector, wherein the control device receives input and the first mobile computing device receives a broadcast and a key value, the control device upon receiving the input simultaneously changes to a first particular channel for a first radio communication and a second particular channel for a second radio communication, the first particular channel associated with the second particular channel, and the first mobile computing device transmits the broadcast and the key value as the first radio communication and the second computing device transmits the broadcast and the key value as the second radio communication simultaneously.

In another example, a method may include receiving, by a control device, input from a user, and a first mobile computing device receiving a broadcast and a key value, simultaneously changing, by the first mobile computing device, a first particular channel for a first radio communication and a second particular channel for a second radio communication, transmitting, by the first mobile computing device, the broadcast and the key value as the first radio communication, and transmitting, by a second computing device, the broadcast and the key value as the second radio communication.

In another example, a non-transitory computer-readable storage medium may have instructions stored thereon that, when executed by at least one computing device cause the at least one computing device to perform operations, the operations including receiving, by a control device, input from a user and receiving a broadcast and a key value, simultaneously changing a first particular channel for a first radio communication and a second particular channel for a second radio communication, transmitting the broadcast and the key value as the first radio communication, and transmitting the broadcast and the key value as the second radio communication.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure.

Wherever possible, the same reference numbers are used throughout the drawings to refer to the same or like elements of an embodiment, and wherein:

FIG. 5 is a flowchart of a method for simultaneously changing more than one radio channel according to an example of the instant disclosure.

DETAILED DESCRIPTION

Figure 1:
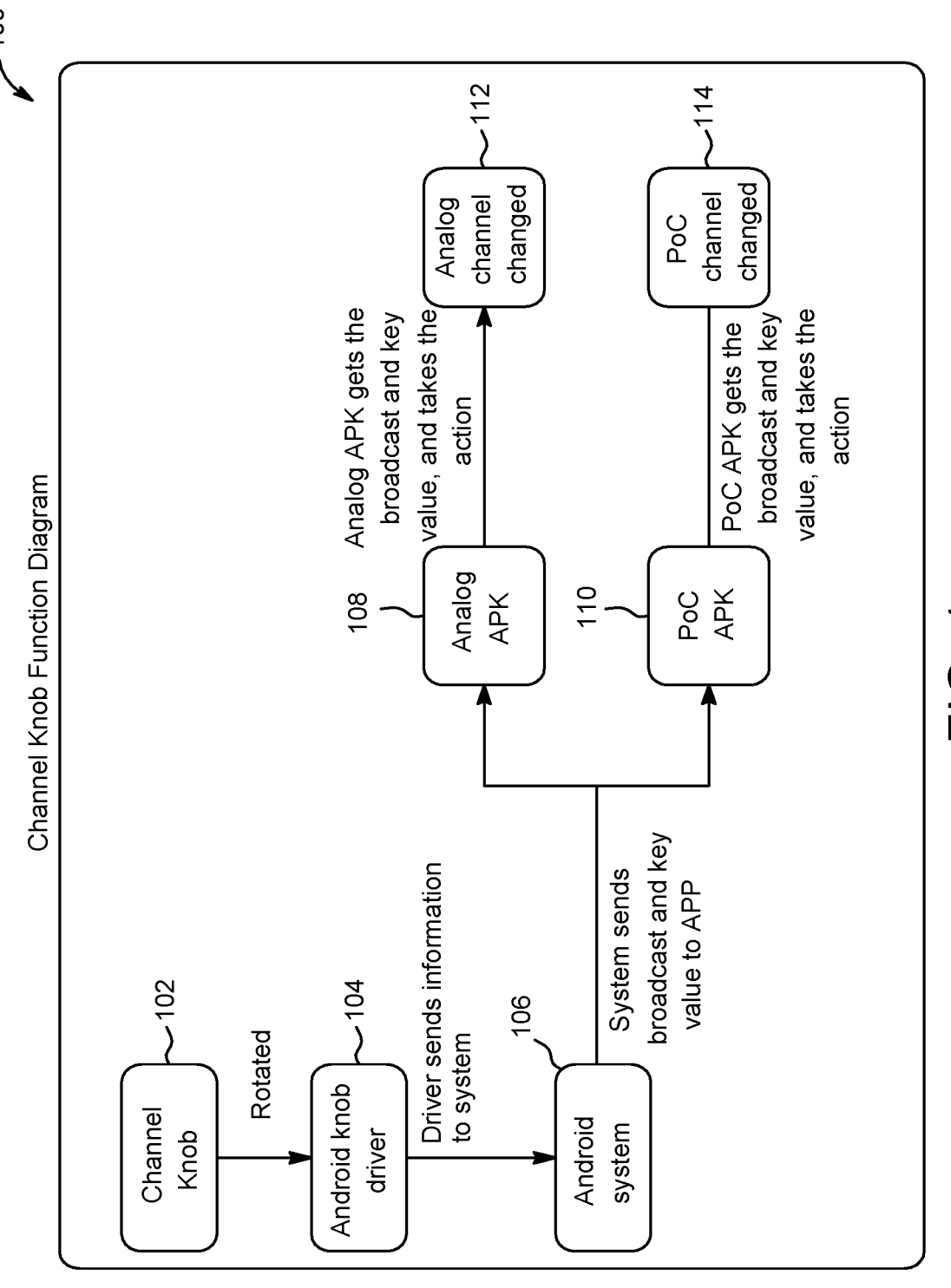
FIG. 1 is a block diagram of a simultaneous radio control system according to an example of the instant disclosure.

The present disclosure is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present disclosure, as the disclosure encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Aspects of a system and method for simultaneous radio control includes a control device, a first mobile computing device connected to the control device using at least one first flexible printed circuit (FPC) connector, and a second computing device that is connected to and communicates with the first mobile computing device using at least one second FPC connector. The control device receives input and the first mobile computing device receives a broadcast and a key value. Upon receiving the input, the control device can simultaneously change to a first particular channel for a first radio communication and a second particular channel for a second radio communication. The first particular channel can be associated with the second particular channel. The first mobile computing device transmits the broadcast and the key value as the first radio communication and the second computing device transmits the broadcast and the key value as the second radio communication simultaneously.

The first radio communication may be push to talk using cellular communication. The second radio communication may be at least one analog signal. The at least one analog signal may be an ultra-high frequency (UHF) signal or a very high frequency (VHF) signal.

The control device can be a graphical user interface (GUI) element that may be displayed by the first mobile computing device. Alternatively, the control device can be a physical knob that receives the input from a user and simultaneously changes to the first particular channel for the first radio communication and the second particular channel for the second radio communication. In another example, the control device may be a physical knob and/or the GUI element. Additionally, as an example, the first particular channel may be paired with the second particular channel by the control device. The first particular channel can be paired with and corresponds with the second particular channel.

In one example, the first mobile computing device may display the GUI element and receive the input from a touch screen of the first mobile computing device. The first mobile computing device may execute an application that displays the GUI element and receives the input from the touch screen.

The second computing device may include one or more radio circuit boards. In addition, the first mobile computing device may communicate with the second computing device using a universal asynchronous receiver-transmitter (UART) port.

As an example, the first mobile computing device may be a single board computer. In addition, the second computing device may be a single board computer.

The first radio communication and the second radio communication may be sent simultaneously to a particular group.

FIG. 1 illustrates a block diagram of a simultaneous radio control system 100 according to an example embodiment. As shown in FIG. 1, one or more channel knobs 102 may receive input from a user. The channel knob 102 may be a physical knob or could be a graphical user interface (GUI) element that may be displayed on a display of a computing device. Upon receipt of the input such as rotation of the knob, this may provide input to a knob driver 104 such as an operating system knob driver. In one example, the operating system 106 may be ANDROID, among others. The knob driver 104 may provide information associated with the rotation of the channel knob 102 to the operating system 106. The operating system 106 may provide a broadcast and a key value to an application that may be executed by the computing device. As an example, the application may utilize an Analog API or Analog package/ANDROID package (APK) 108 and a Push-to-Talk over Cellular (PoC) API or PoC/ANDROID package (APK) 110 and each of the Analog APK 108 and the PoC APK 110 may receive the broadcast and the key value and each may take action. As an example, an Analog channel may be changed 112 and a PoC channel may be changed 114.

Figure 2:
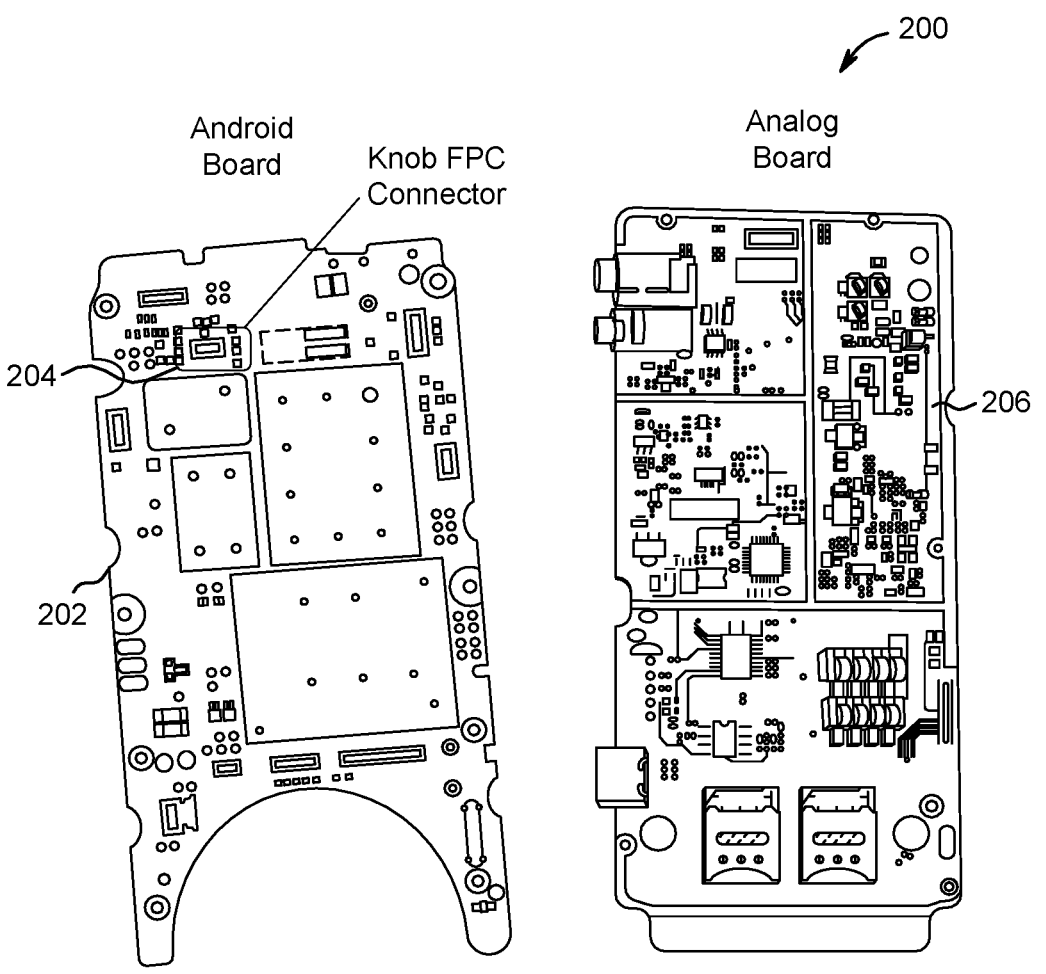
FIG. 2 is a photograph of the simultaneous radio control system according to an example of the instant disclosure.

FIG. 2 is a photograph 200 of the simultaneous radio control system 100 according to an example of the instant disclosure. As shown in FIG. 2, the simultaneous radio control system 100 may include a first mobile computing device 202 having a knob FPC connector 204 and a second computing device 206. The knob FPC connector 204 may connect to the first mobile computing device 202 and may be at least one first FPC connector. Conventional knobs may be welded directly to a computing device board, but in this case, the channel knob 102 and associated hardware may be connected using the knob FPC connector 204, which connects the channel knob 102 to the first mobile computing device 202. This allows the channel knob 102 to be flexibly connected to the first mobile computing device 202 board. As an example, the first mobile computing device 202 may be an ANDROID related computing device or board. In addition, the second computing device 206 may be an Analog computing device or board.

The simultaneous radio control system 100 may include a plurality of computing devices and other devices including at least one first mobile computing device 202 and at least one second computing device 206 that communicate via a communication network. The at least one first mobile computing device 202 and the at least one second computing device 206 may be one or more computing devices, a virtual machine, a container, or another type of packager that may be capable of executing one or more programs or applications. The at least one first mobile computing device 202 and the at least one second computing device 206 may execute and deploy a simultaneous radio control application.

The at least one first mobile computing device 202 is configured to receive data from and/or transmit data to the at least one second computing device 206, through the communication network. Although the at least one first mobile computing device 202 is shown as a single computing device, it is contemplated that the at least one first mobile computing device may include multiple computing devices. In addition, although the at least one second computing device 206 is shown as a single computing device, it is contemplated that the at least one client computing device may include multiple computing devices.

The communication network can be the Internet, an intranet, or another wired or wireless communication network. For example, the communication network may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one first mobile computing device 202 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the simultaneous radio control application. In addition, the at least one first mobile computing device 202 further includes at least one communications interface to transmit and receive communications, messages, and/or signals.

The at least one first mobile computing device 202 can be a laptop computer, a smartphone, a personal digital assistant, a tablet computer, a standard personal computer, or another processing device. The at least one first mobile computing device 202 may include a display, such as a computer monitor, for displaying data and/or graphical user interfaces. The at least one client computing device may also include a Global Positioning System (GPS) hardware device for determining a particular location of the first mobile computing device 202, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one first mobile computing device 202 may display on the display a graphical user interface (or GUI). The graphical user interface may be provided by the simultaneous radio control application. The graphical user interface enables a user of the at least one first mobile computing device to interact with the simultaneous radio control application.

The simultaneous radio control application may be a component of an application and/or service executable by the at least first mobile computing device 202 and the at least one second computing device 206. For example, the simultaneous radio control application may be a single unit of deployable executable code or a plurality of units of deployable executable code. According to one aspect, the simultaneous radio control application may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

Figure 3:
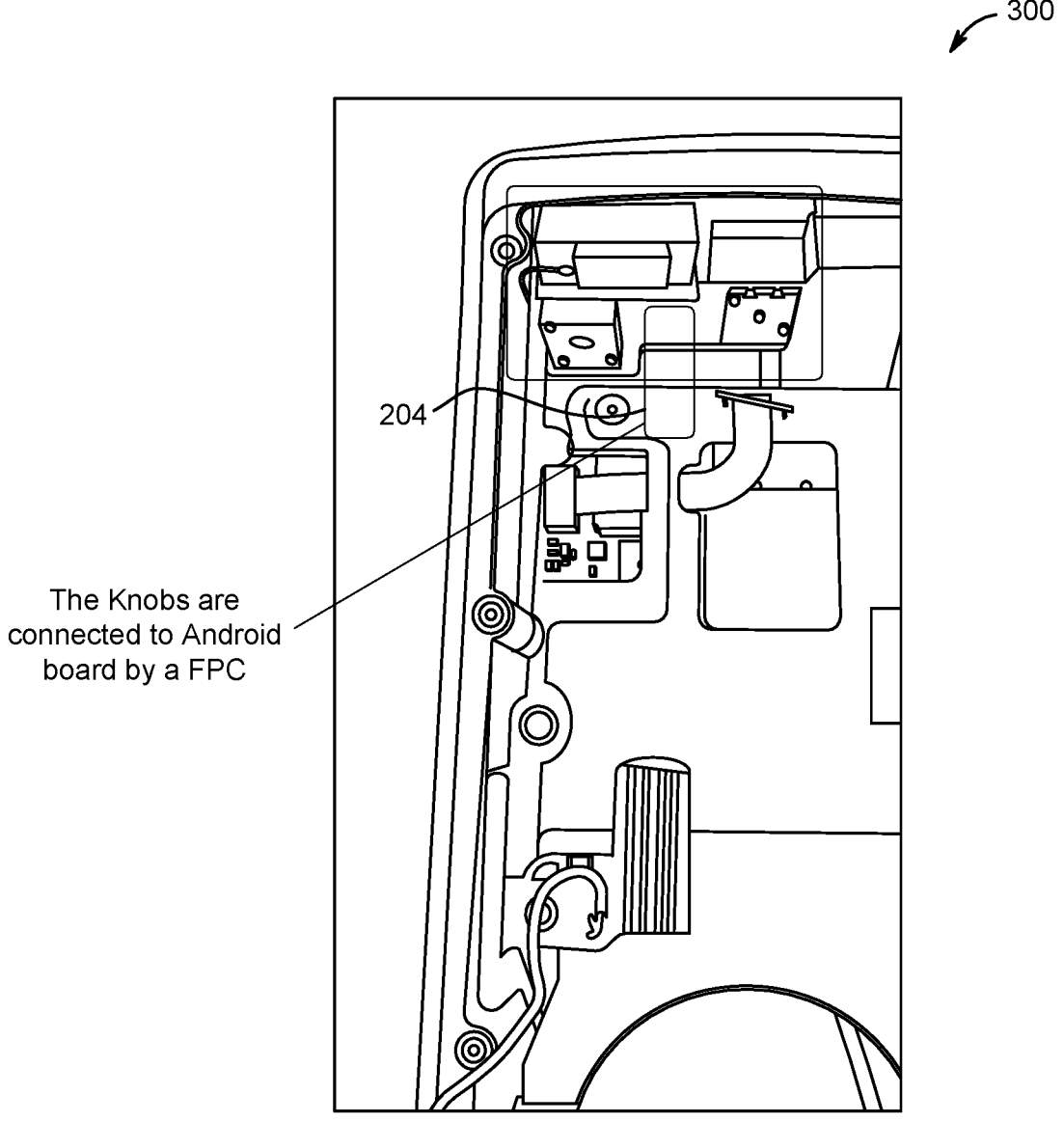
FIG. 3 shows another photograph of the simultaneous radio control system according to an example of the instant disclosure.

FIG. 3 is another photograph 300 of the simultaneous radio control system 100 according to an example of the instant disclosure. As shown in FIG. 3, the control knob 102 may be connected to the first mobile computing device 202 using the knob FPC connector 204.

Figure 4:
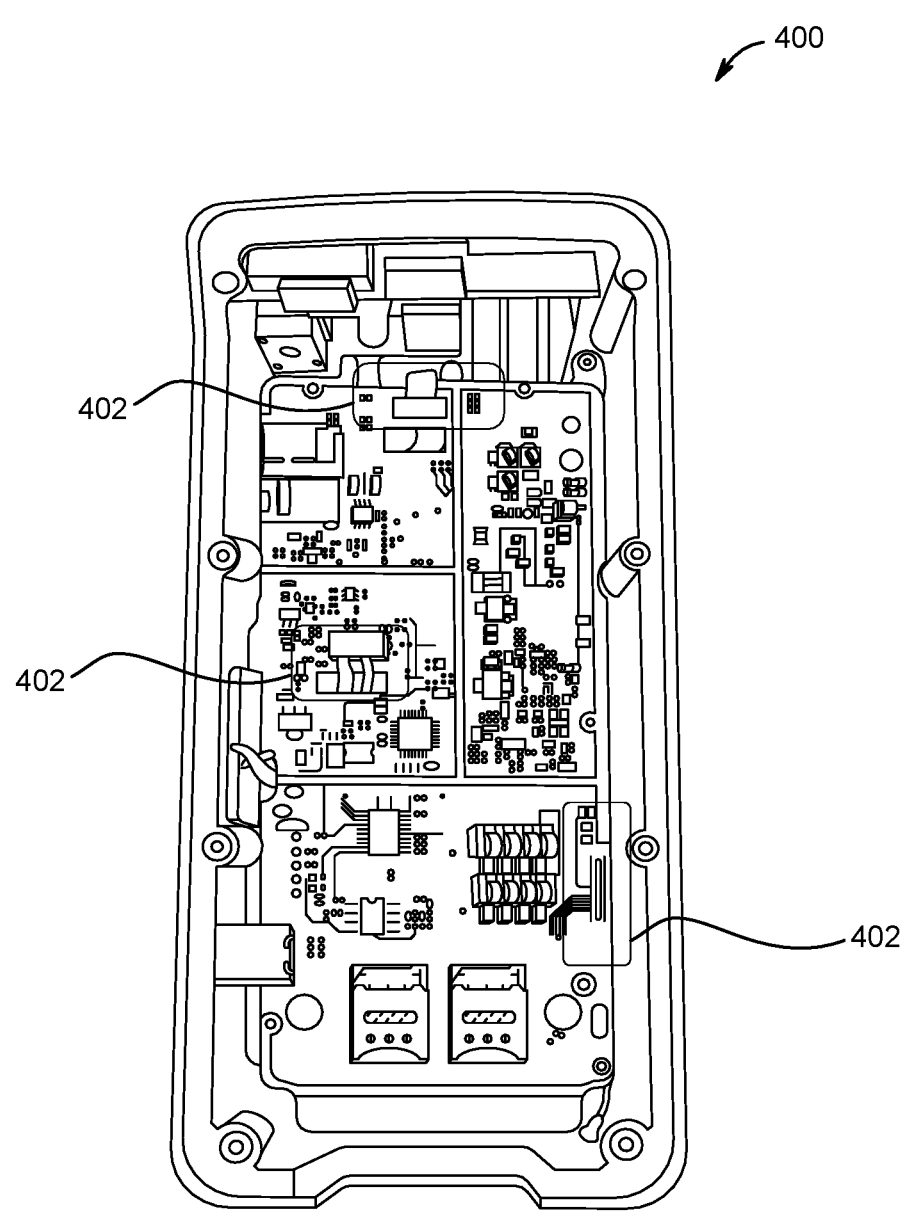
FIG. 4 is another photograph of the simultaneous radio control system according to an example of the instant disclosure.

FIG. 4 is another photograph 400 of the simultaneous radio control system 100 according to an example of the instant disclosure. As shown in FIG. 4, the second computing device 206 may be connected to the first mobile computing device 202 using at least one second FPC connector, e.g., three different FPC connectors 402. Upon receipt of the input or rotation of the control device 102, the simultaneous radio control application may receive the input and send the broadcast and value for transmission.

FIG. 5 illustrates an example method 500 for simultaneously changing more than one radio channel according to an example of the instant disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method 500 includes receiving, by a control device, input from a user, and the first mobile computing device 202 receiving a broadcast and a key value at block 510. As an example the input may be received by a control device 102. The control device 102 may be a graphical user interface (GUI) element displayed by the first mobile computing device 202. The first mobile computing device 202 can display the GUI element and receive the input from a touch screen of the first mobile computing device 202. The first mobile computing device 202 can execute an application that displays the GUI element and receive the input from the touch screen. In another example, the control device 102 may be a physical knob that receives the input from a user.

According to some examples, the method 500 includes simultaneously changing, by the first mobile computing device 202, a first particular channel for a first radio communication and a second particular channel for a second radio communication at block 520. In one example, the first radio communication may be push to talk using cellular communication. As an example, the second radio communication may be at least one analog signal. The at least one analog signal may be at least one of an ultra-high frequency (UHF) signal and a very high frequency (VHF) signal.

According to some examples, the method 500 includes transmitting, by the first mobile computing device 202, the broadcast and the key value as the first radio communication at block 530.

According to some examples, the method 500 includes transmitting, by the second computing device 206, the broadcast and the key value as the second radio communication at block 540. As an example, the first radio communication and the second radio communication are sent simultaneously to a particular group.

The control device 102 may be connected to the at least one first mobile computing device 202 using at least one first flexible printed circuit (FPC) connector 204. The second computing device 206 may be connected to and communicate with the first mobile computing device 202 using at least one second flexible printed circuit (FPC) connector 402. The second computing device 206 may be a radio circuit board. Additionally, the first mobile computing device 202 may communicate with the second computing device 206 using a universal asynchronous receiver-transmitter (UART) port.

In one example, the first mobile computing device 202 may be a single board computer. In another example, the second computing device 206 may be a single board computer.

According to some examples, the control device 102 may be either a physical knob or a graphical user interface (GUI) element that receives the input and simultaneously changes to the first particular channel for the first radio communication and the second particular channel for the second radio communication. As an example, the first particular channel is paired with the second particular channel by the control device 102. As another example, the first particular channel is paired with and corresponds with the second particular channel. A user can use the control device 102 to select a selection such as selection one. This selection one may be associated with a first channel that can be used for Analog and PoC. In one example, for selection one, the first mobile computing device may select a particular channel and the second computing device can select a particular broadcast frequency to be used. In other words, the first radio communication may have a corresponding Analog channel and the second radio communication may have a corresponding PoC channel. They can be modified by the user.

Figure 6:
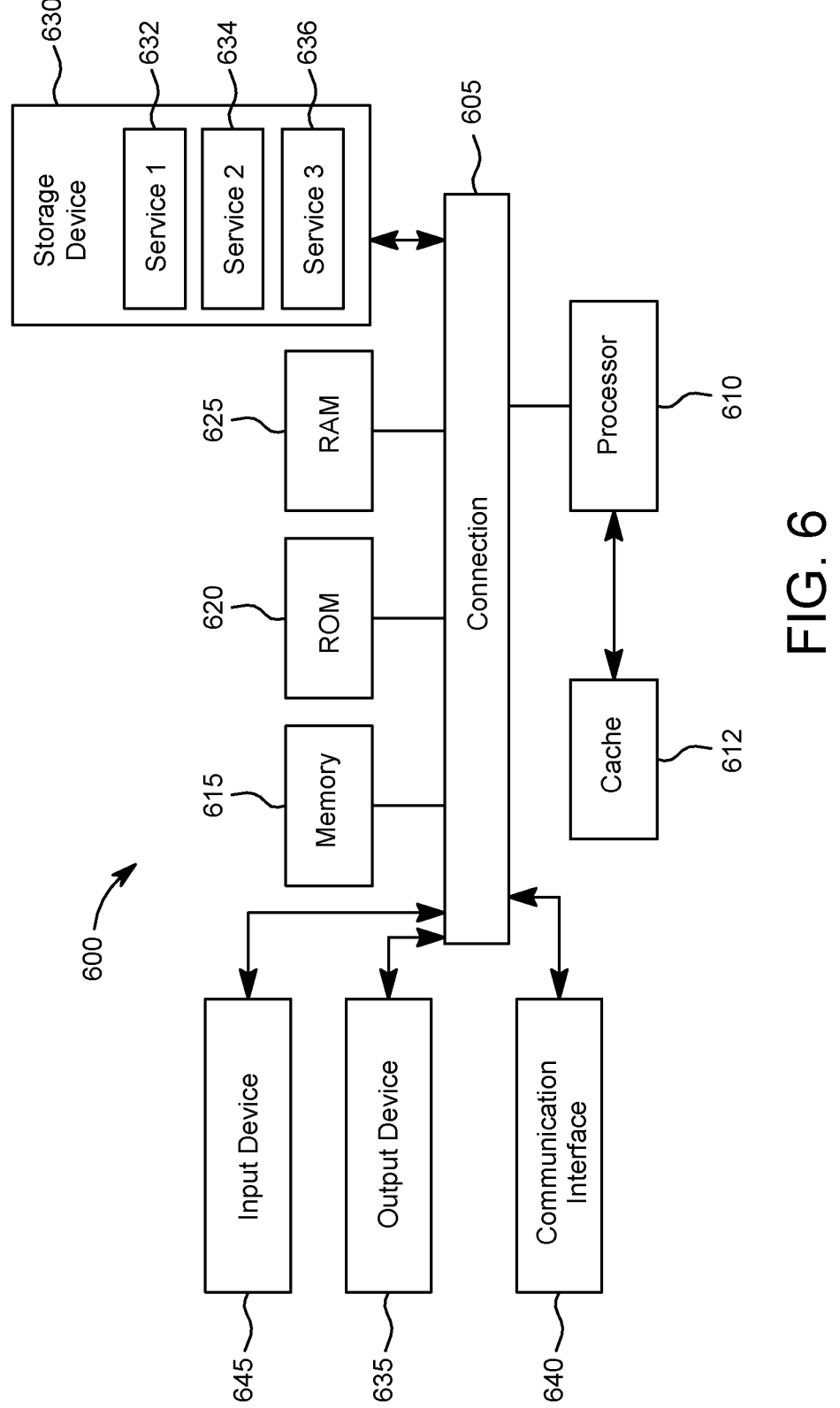
FIG. 6 shows an example of a system for implementing certain aspects of the present technology.

FIG. 6 shows an example of computing system 600, which can be for example any computing device making up the first mobile computing device 202, the second computing device 206, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a control device, a first mobile computing device connected to the control device using a first flexible printed circuit (FPC) connector, and a second computing device that communicates with the first mobile computing device using at least one second FPC connector, wherein the control device receives input and the first mobile computing device receives a broadcast and a key value, the control device upon receiving the input simultaneously changes to a first particular channel for a first radio communication and a second particular channel for a second radio communication, the first particular channel associated with the second particular channel, and the first mobile computing device transmits the broadcast and the key value as the first radio communication and the second computing device transmits the broadcast and the key value as the second radio communication simultaneously.

Aspect 2: The system of Aspect 1, wherein the first radio communication comprises push to talk using cellular communication.

Aspect 3: The system of Aspects 1 and 2, wherein the second radio communication comprises at least one analog signal.

Aspect 4: The system of any of Aspects 1 to 3, wherein the at least one analog signal comprises an ultra-high frequency (UHF) signal and a very high frequency (VHF) signal.

Aspect 5: The system of any of Aspects 1 to 4, wherein the control device comprises a graphical user interface (GUI) element displayed by the first mobile computing device.

Aspect 6: The system of any of Aspects 1 to 5, wherein the first mobile computing device displays the GUI element and receives the input from a touch screen of the first mobile computing device.

Aspect 7: The system of any of Aspects 1 to 6, wherein the first mobile computing device executes an application that displays the GUI element and receives the input from the touch screen.

Aspect 8: The system of any of Aspects 1 to 7, wherein the second computing device comprises a radio circuit board.

Aspect 9: The system of any of Aspects 1 to 8, wherein the first mobile computing device communicates with the second computing device using a universal asynchronous receiver-transmitter (UART) port.

Aspect 10: The system of any of Aspects 1 to 9, wherein the first mobile computing device comprises a single board computer.

Aspect 11: The system of any of Aspects 1 to 10, wherein the second computing device comprises a single board computer.

Aspect 12: The system of any of Aspects 1 to 11, wherein the first radio communication and the second radio communication are sent simultaneously to a particular group.

Aspect 13: The system of any of Aspects 1 to 12, wherein the control device comprises a physical knob that receives the input from a user and simultaneously changes to the first particular channel for the first radio communication and the second particular channel for the second radio communication.

Aspect 14: The system of any of Aspects 1 to 13, wherein the first particular channel is paired with the second particular channel by the control device.

Aspect 15: The system of any of Aspects 1 to 14, wherein the first particular channel is paired with and corresponds with the second particular channel.

Aspect 16: A method comprising: receiving, by a control device, input from a user, and a first mobile computing device receiving a broadcast and a key value, simultaneously changing, by the first mobile computing device, a first particular channel for a first radio communication and a second particular channel for a second radio communication, transmitting, by the first mobile computing device, the broadcast and the key value as the first radio communication, and transmitting, by a second computing device, the broadcast and the key value as the second radio communication.

Aspect 17: The method of Aspect 16, wherein the control device comprises a physical knob that receives the input from a user and simultaneously changes to the first particular channel for the first radio communication and the second particular channel for the second radio communication.

Aspect 18: The method of Aspects 16 and 17, wherein the control device comprises a graphical user interface (GUI) element displayed by the first mobile computing device.

Aspect 19: The method of Aspects 16 to 18, wherein the first mobile computing device displays the GUI element and receives the input from a touch screen of the first mobile computing device.

Aspect 20: The method of Aspects 16 to 19, wherein the first mobile computing executes an application that displays the GUI element and receives the input from the touch screen.

Aspect 21: The method of Aspects 16 to 20, further comprising pairing the first particular channel with the second particular channel by the control device.

Aspect 22: The method of Aspects 16 to 21, wherein the control device is connected to the first mobile computing device using at least one first flexible printed circuit (FPC) connector and the second computing device is connected to the first mobile computing device using at least one second FPC connector.

Aspect 23: A non-transitory computer-readable storage medium, having instructions stored thereon that, when executed by at least one computing device cause the at least one computing device to perform operations, the operations comprising receiving, by a control device, input from a user and receiving a broadcast and a key value, simultaneously changing a first particular channel for a first radio communication and a second particular channel for a second radio communication, transmitting the broadcast and the key value as the first radio communication, and transmitting the broadcast and the key value as the second radio communication.

What is claimed is:

1. A system, comprising:
a control device;
a first mobile computing device connected to the control device using at least one first flexible printed circuit (FPC) connector; and
a second computing device that communicates with the first mobile computing device using at least one second FPC connector, wherein
the control device receives input and the first mobile computing device receives a broadcast and a key value, the control device upon receiving the input simultaneously changes to a first particular channel for a first radio communication and a second particular channel for a second radio communication, the first particular channel associated with the second particular channel, and the first mobile computing device transmits the broadcast and the key value as the first radio communication and the second computing device transmits the broadcast and the key value as the second radio communication simultaneously.

2. The system of claim 1, wherein the first radio communication comprises push to talk using cellular communication.

3. The system of claim 1, wherein the second radio communication comprises at least one analog signal.

4. The system of claim 3, wherein the at least one analog signal comprises an ultra-high frequency (UHF) signal and a very high frequency (VHF) signal.

5. The system of claim 1, wherein the control device comprises a graphical user interface (GUI) element displayed by the first mobile computing device.

6. The system of claim 5, wherein the first mobile computing device displays the GUI element and receives the input from a touch screen of the first mobile computing device.

7. The system of claim 6, wherein the first mobile computing device executes an application that displays the GUI element and receives the input from the touch screen.

8. The system of claim 1, wherein the second computing device comprises a radio circuit board.

9. The system of claim 1, wherein the first mobile computing device communicates with the second computing device using a universal asynchronous receiver-transmitter (UART) port.

10. The system of claim 1, wherein the first mobile computing device comprises a single board computer.

11. The system of claim 1, wherein the second computing device comprises a single board computer.

12. The system of claim 1, wherein the first radio communication and the second radio communication are sent simultaneously to a particular group.

13. The system of claim 1, wherein the control device comprises a physical knob that receives the input from a user and simultaneously changes to the first particular channel for the first radio communication and the second particular channel for the second radio communication.

14. The system of claim 1, wherein the first particular channel is paired with the second particular channel by the control device.

15. The system of claim 1, wherein the first particular channel is paired with and corresponds with the second particular channel.

16. A method, comprising:
  receiving, by a control device, input from a user, and receiving by a first mobile computing device a broadcast and a key value;
  simultaneously changing, by the first mobile computing device, a first particular channel for a first radio communication and a second particular channel for a second radio communication;
  transmitting, by the first mobile computing device, the broadcast and the key value as the first radio communication; and
  transmitting, by a second computing device, the broadcast and the key value as the second radio communication.

17. The method of claim 16, wherein the control device comprises a physical knob that receives the input from a user and simultaneously changes to the first particular channel for the first radio communication and the second particular channel for the second radio communication.

18. The method of claim 16, wherein the control device comprises a graphical user interface (GUI) element displayed by the first mobile computing device.

19. The method of claim 18, wherein the first mobile computing device displays the GUI element and receives the input from a touch screen of the first mobile computing device.

20. The method of claim 19, wherein the first mobile computing executes an application that displays the GUI element and receives the input from the touch screen.

21. The method of claim 16, further comprising pairing the first particular channel with the second particular channel by the control device.

22. The method of claim 16, wherein the control device is connected to the first mobile computing device using at least one first flexible printed circuit (FPC) connector and the second computing device is connected to the first mobile computing device using at least one second FPC connector.

23. A non-transitory computer-readable storage medium, having instructions stored thereon that, when executed by at least one computing device cause the at least one computing device to perform operations, the operations comprising:
  receiving, by a control device, input from a user and receiving a broadcast and a key value;
  simultaneously changing a first particular channel for a first radio communication and a second particular channel for a second radio communication;
  transmitting the broadcast and the key value as the first radio communication; and
  transmitting the broadcast and the key value as the second radio communication.

* * * * *